(12) United States Patent
Chen et al.

(10) Patent No.: US 7,009,857 B2
(45) Date of Patent: Mar. 7, 2006

(54) SOFT-START CHARGE PUMP CIRCUIT

(75) Inventors: Tien-Tzu Chen, Hsin-Chu (TW);
Guang-Nan Tzeng, Hsin-Chu (TW)

(73) Assignee: Aimtron Technology Corp., Hsinchu (TW)

( * ) Notice: Subject to any disclaimer, the term of this patent is extended or adjusted under 35 U.S.C. 154(b) by 114 days.

(21) Appl. No.: 10/708,107

(22) Filed: Feb. 10, 2004

(65) Prior Publication Data
US 2005/0174815 A1    Aug. 11, 2005

(51) Int. Cl.
*H02M 3/18* (2006.01)

(52) U.S. Cl. .................. 363/60; 327/536; 327/309

(58) Field of Classification Search .............. 363/48, 363/59, 60, 49; 323/282, 238, 283–288; 327/157–159, 536–540
See application file for complete search history.

(56) References Cited

U.S. PATENT DOCUMENTS

| | | | |
|---|---|---|---|
| 5,861,737 A | * | 1/1999 | Goerke et al. ............... 323/282 |
| 5,945,870 A | * | 8/1999 | Chu et al. .................... 327/536 |
| 6,121,760 A | * | 9/2000 | Marshall et al. ............. 323/282 |

\* cited by examiner

*Primary Examiner*—Rajnikant B. Patel
(74) *Attorney, Agent, or Firm*—Winston Hsu (57) ABSTRACT

A charge pump is driven by at least one clock signal, for converting a supply voltage source into a pumping voltage. The pumping voltage is a function of an amplitude of the at least one clock signal such that an absolute value of the pumping voltage is larger when the amplitude of the at least one clock signal is larger. The amplitude of the at least one clock signal is so modulated as to gradually change from an activation value during an amplitude modulation period. The amplitude modulation period lasts longer than a period of the at least one clock signal by one or more metric orders. The charge pump is activated by the at least one clock signal with the amplitude of the activation value. Thereafter, the charge pump is controlled in such a way that the absolute value of the pumping voltage gradually changes along with the modulation of the amplitude of the at least one clock signal.

3 Claims, 6 Drawing Sheets

SOFT-START CHARGE PUMP CIRCUIT

BACKGROUND OF INVENTION

1. Field of the Invention

The present invention relates to a charge pump circuit and, more particularly, to a charge pump circuit capable of generating a soft-start pumping voltage for so appropriately driving a power switch as to suppress maximum inrush current upon activation.

2. Description of the Related Art

Charge pump circuits, or capacitive voltage multipliers, are circuits that generate a voltage larger than a supply voltage from which the charge pump circuits operate. With such voltage boosting ability, the charge pump circuits can be applied to provide from a single supply voltage source desired pumping voltages for electronics systems consisting of various components that operate with different voltages, such as portable computers, thereby avoiding additional employment of independent high voltage sources.

On the other hand, a variety of peripheral devices coupled to the portable computers through universal serial bus (USB) or other type connecting ports also need power from the supply voltage source. In this case, the charge pump circuits may be applied to drive power switches, which are typically implemented by NMOS transistors and provided to control switching operations between the supply voltage source and the peripheral devices. Through supplying a gate electrode of the NMOS power switch transistor with a voltage much higher than that at its drain electrode, the charge pump circuits can so fully turn on the NMOS power switch transistor as to provide a minimum ON resistance during normal operations of the peripheral devices.

Figure 1A:
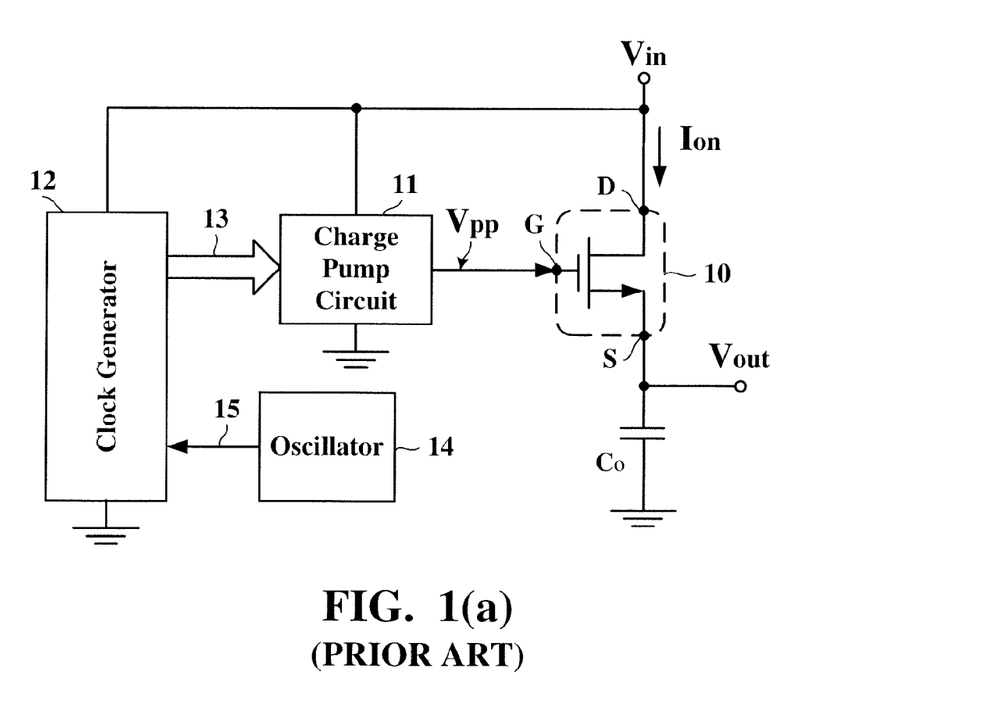
FIG. 1(a) is a circuit block diagram showing a conventional charge pump circuit applied to drive a power switch.

FIG. 1($a$) is a circuit block diagram showing a conventional charge pump circuit 11 applied to drive a power switch 10. Referring to FIG. 1($a$), the power switch 10 implemented by an NMOS transistor has a drain electrode D as an input terminal and a source electrode S as an output terminal. The drain electrode D of the power switch 10 is connected to a supply voltage source $V_{in}$ while the source electrode S provides an output voltage $V_{out}$ for external loads (not shown), such as the peripheral devices with USB connecting plugs. In addition, an output capacitor $C_o$ is connected between the source electrode S of the power switch 10 and a ground potential. The charge pump circuit 11 converts the supply voltage source $V_{in}$ into a higher pumping voltage $V_{pp}$ for controlling a gate electrode G of the power switch 10. When the voltage at the gate electrode G of the power switch 10 is considerably higher than the supply voltage source $V_{in}$ at the drain electrode D, the power switch 10 is fully turned on to provide a minimum ON resistance such that the output voltage $V_{out}$ at the source electrode S of the power switch 10 is almost equal to the supply voltage source $V_{in}$ at the drain electrode D. As a result, the supply voltage source $V_{in}$ is effectively provided to the external loads. When the power switch 10 is turned on, an ON current $I_{on}$ is flowed from the supply voltage source $V_{in}$, passing the power switch 10 through the drain electrode D to the source electrode S, for supplying the external loads and the output capacitor $C_o$.

Figure 1B:
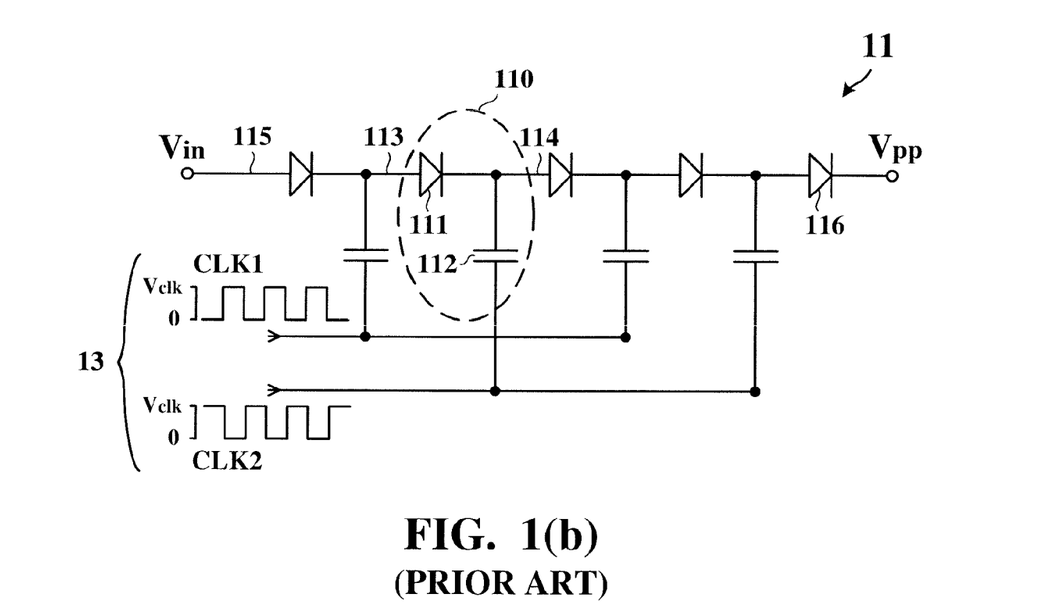
FIG. 1(b) is a detailed circuit diagram showing a conventional charge pump circuit.

The pumping operation of the charge pump circuit 11 is under the control of at least one overlapping or non-overlapping clock signals 13 with a constant amplitude output from a clock generator 12. Conventionally, each of the constant amplitude clock signals 13 is a pulse train in synchronization with respect to each other, whose frequency is determined by an oscillation signal 15 with a predetermined frequency output from an oscillator 14. For example, the charge pump circuit 11 may be a well-known Dickson type charge pump, as shown in FIG. 1($b$). Referring to FIG. 1($b$), the charge pump circuit 11 may include a plurality of serially-connected charge pump stages, one of which is labeled 110. Each charge pump stage includes a diode 111 and a pump capacitor 112, and has an input node 113 and an output node 114. In this Dickson type charge pump, the constant amplitude clock signals 13 output from the clock generator 12 are a complementary pair of clock signals CLK1 and CLK2 for driving the various pump stage capacitors. Odd-numbered pump stages are driven by the clock signal CLK1 while even-numbered pump stages are driven by the clock signal CLK2. The input node 115 of the first serially-connected charge pump stage is usually connected to the supply voltage source $V_{in}$. A final isolation diode 116 may be considered as part of the last serially-connected charge pump stage, from which the pumping voltage $V_{pp}$ of the charge pump circuit 11 is asserted.

The clock signals CLK1 and CLK2 may be overlapping or non-overlapping clock signals with the constant amplitude $V_{clk}$, for boosting the voltage conveyed to its input node by an amount equal to the clock amplitude $V_{clk}$ minus a forward diode drop $V_d$, i.e. $V_{clk}-V_d$. If the effect of the final isolation diode 116 is included, the maximum theoretical pumping voltage $V_{pp}$ is equal to $N \cdot V_{clk}-(N+1) \cdot V_d$, where N is the number of charge pump stages.

Figure 2A:
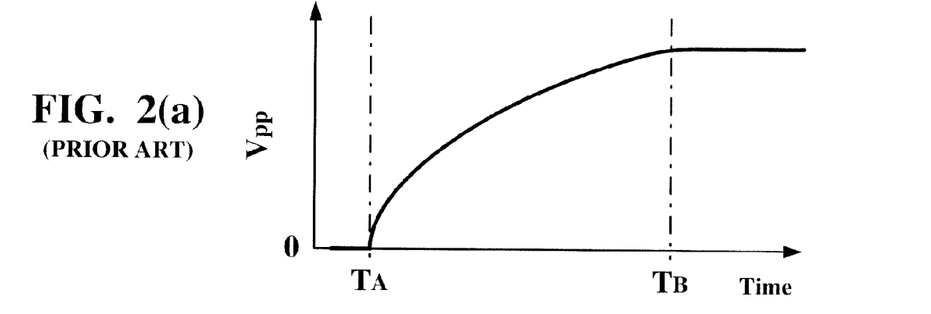
FIG. 2(a) is a timing chart showing a pumping voltage generated by the charge pump circuit.
Figure 2B:
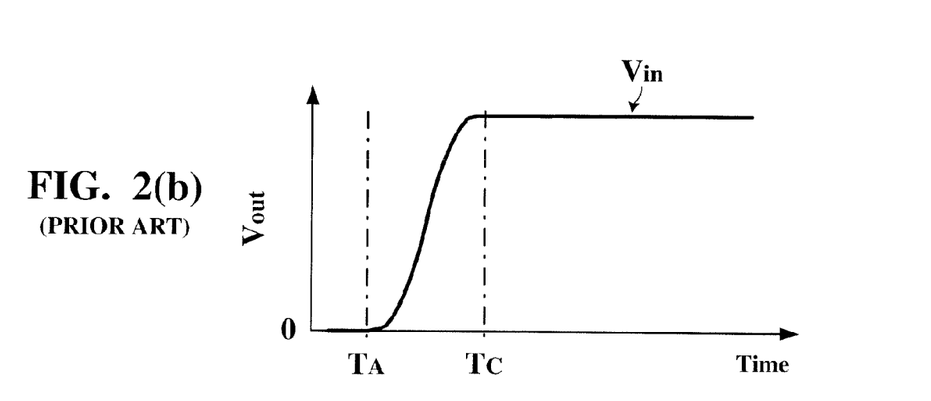
FIG. 2(b) is a timing chart showing an output voltage of the power switch.
Figure 2C:
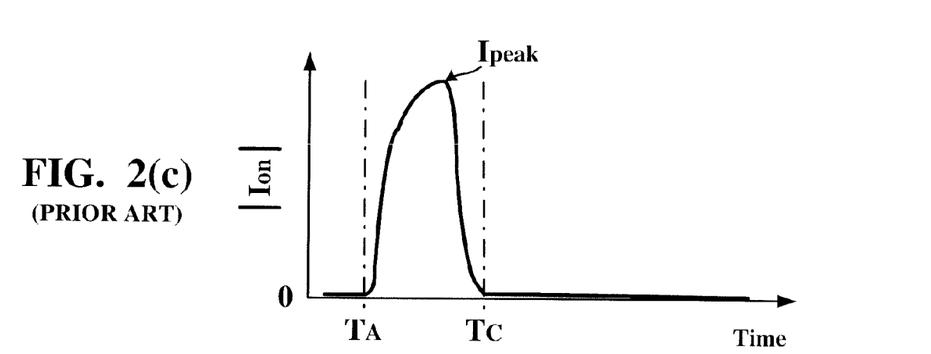
FIG. 2(c) is a timing chart showing an ON current flowing through the power switch.

FIGS. 2($a$) to 2($c$) are operational timing charts showing the conventional charge pump circuit 11 of FIG. 1($a$) applied to drive the power switch 10. More specifically, FIG. 2($a$) is a timing chart showing the pumping voltage $V_{pp}$ generated by the charge pump circuit 11. FIG. 2($b$) is a timing chart showing the output voltage $V_{out}$ of the power switch 10. FIG. 2($c$) is a timing chart showing the ON current $I_{on}$ flowing through the power switch 10. Referring to FIG. 2($a$), the pumping voltage $V_{pp}$ is zero before a time $T_A$ because the charge pump circuit 11 stays at a disable state then. The charge pump circuit 11 is activated on the time $T_A$, starting the voltage boosting operation. During a transient period from the time $T_A$ until the time $T_B$, the pumping voltage $V_{pp}$ of the charge pump circuit 11 rapidly rises from zero to a stable maximum, such as $N \cdot V-(N+1) \cdot V_d$, as described above. By the time $T_B$ the charge pump circuit 11 reaches a stable operational state at which the pumping voltage $V_{pp}$ remains stable.

Referring to FIGS. 2($b$) and 2($c$), the power switch 10 is turned off before the activation time $T_A$ since the pumping voltage $V_{pp}$ of the charge pump circuit 11 is smaller than a threshold voltage of the power switch 10, so the output voltage $V_{out}$ is zero and the ON current $I_{on}$ is also zero. After the pumping voltage $V_{pp}$ of the charge pump circuit 11 rises above the threshold voltage, the power switch 10 is turned on to start charging the output capacitor $C_o$, resulting in an increase of the output voltage $V_{out}$ of the power switch 10. Since the pumping voltage $V_{pp}$ of the charge pump circuit 11 drives the power switch 10 to provide the minimum ON resistance, the output voltage $V_{out}$ of the power switch 10 almost reaches the supply voltage source $V_{in}$ by a time $T_C$.

When applied to drive the power switch 10, the conventional charge pump circuit 11 inevitably brings about a problem on the activation of the power switch 10. Due to the rapid increase of the pumping voltage $V_{pp}$ of the charge pump circuit 11, it takes a relatively short time after the activation for the power switch 10 to provide the minimum ON resistance. However, since the output voltage $V_{out}$ is zero upon the activation time because the output capacitor $C_o$ has not yet been charged, the supply voltage source $V_{in}$ produces through the power switch 10 an extremely large ON current $I_{on}$, i.e. the inrush current. If the maximum inrush current $I_{peak}$ receives no cure or appropriate suppression, the supply voltage source $V_{in}$ possibly drops with a great degree during the activation or the power switch 10 may even be burned by the maximum inrush current $I_{peak}$.

SUMMARY OF INVENTION

In view of the above-mentioned problem, an object of the present invention is to provide a charge pump circuit capable of generating a soft-start pumping voltage, which increases relatively slowly after the activation.

Another object of the present invention is to provide a charge pump circuit capable of driving a power switch in such a way that the maximum inrush current is appropriately suppressed.

According to the present invention, a charge pump is driven by at least one clock signal, for converting a supply voltage source into a pumping voltage. The pumping voltage is a function of an amplitude of the at least one clock signal such that an absolute value of the pumping voltage is larger when the amplitude of the at least one clock signal is larger. The amplitude of the at least one clock signal is so modulated as to gradually change from an activation value during an amplitude modulation period. The amplitude modulation period lasts longer than a period of the at least one clock signal by one or more metric orders. The charge pump is activated by the at least one clock signal with the amplitude of the activation value such that the absolute value of the pumping voltage thus generated is relatively small. After the activation the charge pump is controlled in such a way that the absolute value of the pumping voltage gradually changes along with the modulation of the amplitude of the at least one clock signal. Therefore, a rising rate of the absolute value of the pumping voltage is suppressed.

Preferably, the amplitude of the at least one clock signal reaches a stable value after the amplitude modulation period.

Preferably, the stable value is equal to the supply voltage source.

Preferably, the amplitude of the at least one clock signal is determined by a gradually increasing potential difference across a capacitor when the capacitor is charged.

Preferably, the pumping voltage is applied to control a power switch.

Preferably, the at least one clock signal is generated by a clock amplitude modulator. The clock amplitude modulator includes: a soft-start controller for generating a soft-start control signal; and a level shifter for modulating the amplitude of the at least one clock signal in response to the soft-start control signal.

Preferably, the soft-start control signal is a voltage signal with a gradually changing level.

Preferably, the amplitude of the at least one clock signal is determined by the gradually changing level of the soft-start control signal.

Preferably, the soft-start controller includes: a switch capacitor equivalent resistor having a first terminal and a second terminal, the first terminal being connected to the supply voltage source; and a charging capacitor connected between the second terminal and a ground potential such that the soft-start control signal is asserted at the second terminal.

Preferably, the level shifter includes at least one clock channel for respectively generating the at least one clock signal. Each of the at least one clock channel has an output stage inverter whose power supply terminal is coupled to receive the soft-start control signal, thereby respectively controlling the amplitude of the at least one clock signal.

Preferably, each of the at least one clock channel further includes an input stage inverter having a power supply terminal coupled to receive the supply voltage source for providing a constant amplitude clock signal to the output stage inverter.

BRIEF DESCRIPTION OF DRAWINGS

The above-mentioned and other objects, features, and advantages of the present invention will become apparent with reference to the following descriptions and accompanying drawings, wherein:

FIGS. 2(a) to 2(c) are operational timing charts showing a conventional charge pump circuit applied to drive a power switch, wherein

FIGS. 5(a) to 5(d) are operational timing charts showing a soft-start charge pump circuit according to the present invention applied to drive a power switch, wherein

DETAILED DESCRIPTION

The preferred embodiments according to the present invention will be described in detail with reference to the drawings.

Figure 3A:
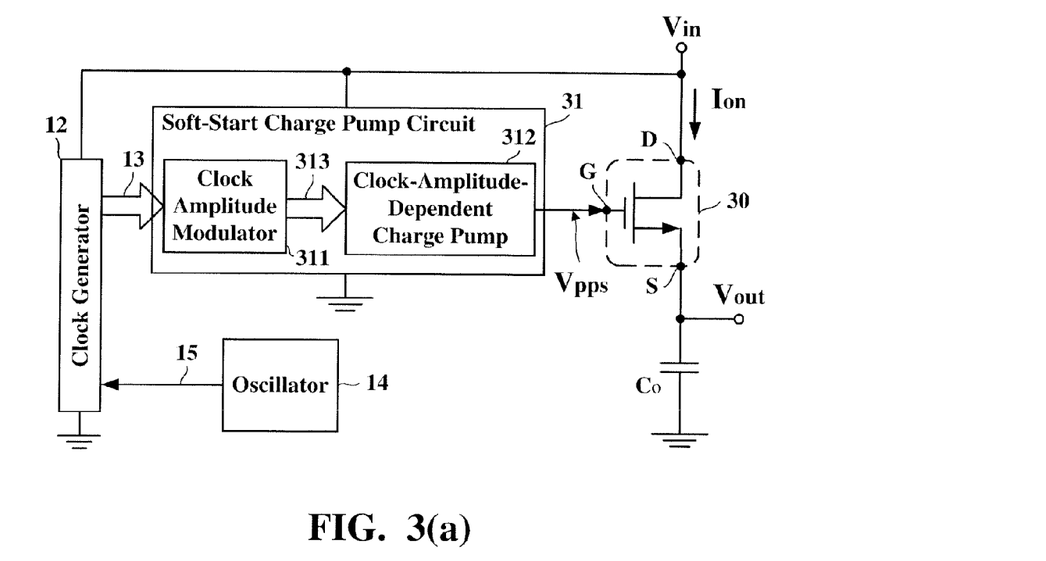
FIG. 3(a) is a circuit block diagram showing a soft-start charge pump circuit according to the present invention applied to drive a power switch.

FIG. 3(a) is a circuit block diagram showing a soft-start charge pump circuit 31 according to the present invention applied to drive a power switch 30. As apparently seen by comparing FIG. 3(a) with FIG. 1(a), the circuit shown in FIG. 3(a) is obtained simply through replacing the conventional charge pump circuit 11 of FIG. 1(a) with the soft-start charge pump circuit 31 according to the present invention. The power switch 30 shown in FIG. 3(a) is identical to the power switch 10 shown in FIG. 1(a) except that the power switch 30 is driven by the soft-start charge pump circuit 31. Therefore, the circuit components in FIG. 3(a) similar to those in FIG. 1(a) should refer to FIG. 1(a) and hereinafter detailed descriptions thereof are neglected for the sake of simplicity.

Referring to FIG. 3(a), the soft-start charge pump circuit 31 under the control of the at least one constant amplitude clock signals 13 converts the supply voltage source $V_{in}$ to a pumping voltage $V_{pps}$ with a soft-start characteristic, for being applied to control the gate electrode of the power switch 30. The pumping voltage $V_{pps}$ with the soft-start characteristic is referred to that it takes a relatively longer transient period for the soft-start pumping voltage $V_{pps}$ to upwardly reach a stable value from an activation value than for the conventional pumping voltage $V_{pp}$. That is, the soft-start pumping voltage $V_{pps}$ has a relatively slow rate of increase during the transient period. More specifically, the soft-start charge pump circuit 31 includes a clock amplitude modulator 311 and a clock-amplitude-dependent charge pump 312. The clock amplitude modulator 311 is employed to perform amplitude modulation on the at least one constant amplitude clock signals 13 received by the soft-start charge pump circuit 31, thereby generating at least one amplitude modulating clock signals 313. The clock-amplitude-dependent charge pump 312 is referred to as a charge pump whose pumping voltage $V_{pp}$ is dependent on the amplitude of the clock signals, i.e. the pumping voltage $V_{pp}$ is a function of the clock amplitude $V_{clk}$. Typically, the pumping voltage $V_{pp}$ generated by the clock-amplitude-dependent charge pump 312 is larger when the amplitude of the clock signals is larger. For example, the Dickson type charge pump 11 shown in FIG. 1(b) is one kind of the clock-amplitude-dependent charge pumps since its pumping voltage $V_{pp}$ has the functional relationship $N \cdot V_{clk} - (N+1) \cdot V_d$ with the clock amplitude $V_{clk}$ and a larger pumping voltage $V_{pp}$ is obtained from a larger clock amplitude $V_{clk}$. Based on such characteristic of the clock-amplitude-dependent charge pump 312, the soft-start charge pump circuit 31 according to the present invention effectively generates the soft-start pumping voltage $V_{pps}$. More specifically, in one embodiment of the soft-start charge pump circuit 31 according to the present invention, the at least one amplitude modulating clock signals 313 are designed as the clock signals with a continuously changing amplitude that gradually increases from a minimum upon the activation of the soft-start charge pump circuit 31 to a stable maximum. Consequently, the soft-start pumping voltage $V_{pps}$ generated by the soft-start charge pump circuit 31 gradually increases along with the slow rise of the amplitude of the amplitude modulating clock signals 313.

Figure 3B:
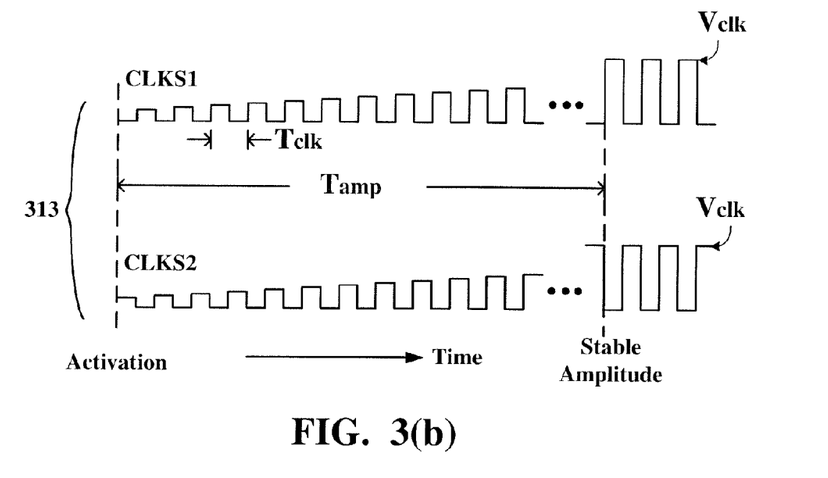
FIG. 3(b) is a waveform timing chart showing an example of amplitude modulating clock signals according to the present invention.

FIG. 3(b) is a waveform timing chart showing an example of the amplitude modulating clock signals 313 according to the present invention. Referring to FIG. 3(b), the amplitude modulating clock signals CLKS1 and CLKS2 are a complementary pair of the amplitude modulating clock signals 313. The amplitude modulating clock signals CLKS1 and CLKS2 may be obtained through using the clock amplitude modulator 311 to convert the conventional clock signals CLK1 and CLK2 with the constant amplitude $V_{clk}$ shown in FIG. 1(b). As a result, the amplitude modulating clock signals CLKS1 and CLKS2 have an amplitude which is minimum upon the activation, gradually increases thereafter, and reaches the stable maximum $V_{clk}$ after a predetermined amplitude modulation period $T_{amp}$. In one embodiment according to the present invention, the stable maximum $V_{clk}$ is set to be equal to the supply voltage source $V_{in}$. The amplitude modulation period $T_{amp}$ may be modified longer or shorter in accordance with the requirement and specification of the practical circuit application. The length of the amplitude modulation period $T_{amp}$ directly affects the length of the transient period of the soft-start pumping voltage $V_{pps}$ from the activation value to the stable value. In one embodiment of the present invention, the amplitude modulation period $T_{amp}$ is set to last longer than a period $T_{clk}$ of the clock signals by at least one metric order. In another embodiment of the present invention, the clock period $T_{clk}$ is about 10 microseconds ($\mu s$) while the amplitude modulation period $T_{amp}$ is about 2.5 milliseconds (ms).

It should be noted that in the soft-start charge pump circuit 31 according to the present invention, the clock-amplitude-dependent charge pump 312 has already been activated to perform the voltage boosting operation during the amplitude modulation period $T_{amp}$. During the amplitude modulation period $T_{amp}$, the soft-start pumping voltage $V_{pps}$ of the clock-amplitude-dependent charge pump 312 gradually increases along with the slow rise of the amplitude of the amplitude modulating clock signals 313 since the soft-start pumping voltage $V_{pps}$ is dependent on the amplitude of the amplitude modulation clock signals 313.

Figure 4A:
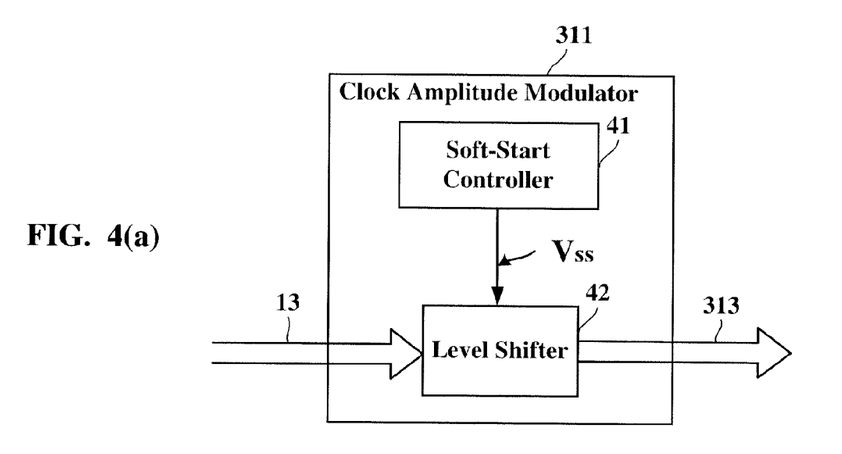
FIG. 4(a) is a circuit block diagram showing a clock amplitude modulator according to the present invention.

FIG. 4(a) is a circuit block diagram showing the clock amplitude modulator 311 according to the present invention. Referring to FIG. 4(a), the clock amplitude modulator 311 includes a soft-start controller 41 and a level shifter 42. The soft-start controller 41 outputs a soft-start control signal $V_{ss}$ to the level shifter 42. In response to the soft-start control signal $V_{ss}$, the level shifter 42 changes the constant amplitude of the conventional clock signals 13 so as to generate the amplitude modulating clock signals 313. The soft-start control signal $V_{ss}$ is employed to determine the amplitude modulation applied for the amplitude modulating clock signals 313, including the minimum amplitude upon the activation, the maximum amplitude when reaching stable, the length of the amplitude modulation period $T_{amp}$, and/or how the amplitude changes during the amplitude modulation period $T_{amp}$, for example.

Figure 4B:
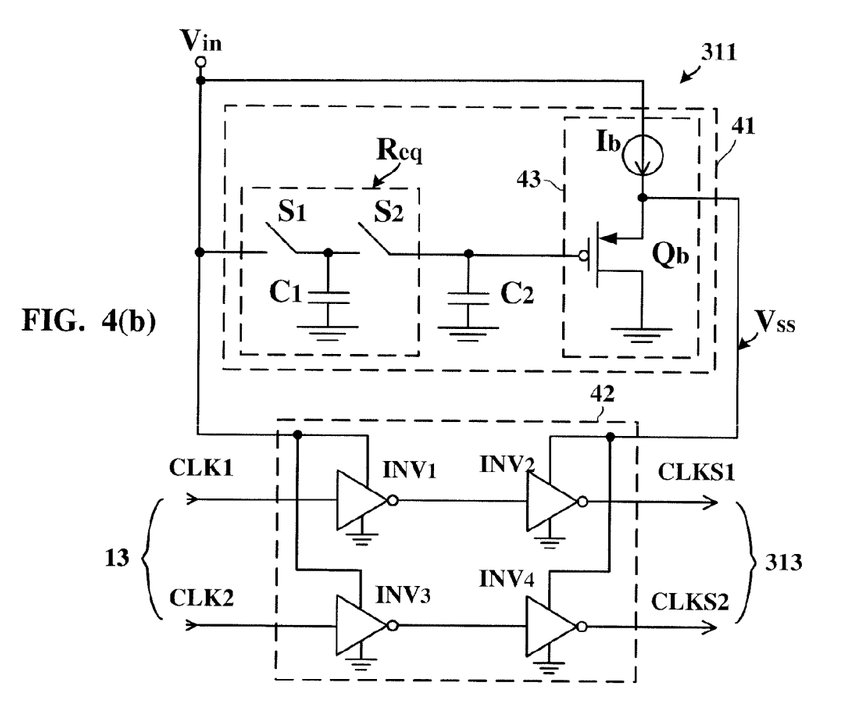
FIG. 4(b) is a detailed circuit diagram showing an example of a clock amplitude modulator according to the present invention.

FIG. 4(b) is a detailed circuit diagram showing an example of the clock amplitude modulator 311 according to the present invention. Referring to FIG. 4(b), the soft-start controller 41 includes two switches $S_1$ and $S_2$ and two capacitors $C_1$ and $C_2$. The switches $S_1$ and $S_2$ are controlled to be alternately turned on with respect to each other and will not be turned off at the same time. When the switch $S_1$ is turned on, the supply voltage source $V_{in}$ charges the capacitor $C_1$ through the switch $S_1$. When the switch $S_2$ is turned on, the capacitor $C_1$ discharges through the switch $S_2$ to the capacitor $C_2$. According to the well-known switch capacitor technique, the circuit constructed by the switches $S_1$ and $S_2$ and the capacitor $C_1$ may be considered as an equivalent resistor $R_{eq}$ coupled between the supply voltage source $V_{in}$ and the capacitor $C_2$. Therefore, the supply voltage source $V_{in}$ charges the capacitor $C_2$ through the equivalent resistor $R_{eq}$, resulting in that a potential difference across the capacitor $C_2$ gradually increases with a time constant $R_{eq} \cdot C_2$. The potential difference across the capacitor $C_2$ may be an appropriate candidate for the soft-start control signal $V_{ss}$. In the embodiment shown in FIG. 4(b), the potential difference across the capacitor $C_2$ is output to the level shifter 42 through an output buffer circuit 43, thereby producing a soft-start control signal $V_{ss}$ with an enhanced driving ability. The output buffer circuit 43 includes a buffer current source $I_b$ and a buffer transistor $Q_b$. The buffer current source $I_b$ is connected to the supply voltage source $V_{in}$ for providing the necessary driving current. The buffer transistor $Q_b$ is implemented by a PMOS transistor such that the soft-start control signal $V_{ss}$ in practical use is level-shifted from the potential difference across the capacitor $C_2$ approximately with a constant value, i.e. a threshold voltage of the buffer transistor $Q_b$.

The level shifter 42 shown in FIG. 4(b) is applied to modulate the two conventional clock signals CLK1 and CLK2 with the constant amplitude $V_{clk}$ and, therefore, is correspondingly provided with two clock channels. More specifically, two inverters $INV_1$ and $INV_2$ are cascaded in line to form one clock channel, using the inverter $INV_1$ as the input stage and the inverter $INV_2$ as the output stage. In the same way, two inverters $INV_3$ and $INV_4$ are cascaded in line to form the other clock channel, using the inverter $INV_3$ as the input stage and the inverter $INV_4$ as the output stage. The input stage inverters $INV_1$ and $INV_3$ have their power supply terminals coupled to the supply voltage source $V_{in}$ while the output stage inverters $INV_2$ and $INV_4$ have their power supply terminals coupled to receive the soft-start control signal $V_{ss}$. Since each clock channel is constructed by two cascaded inverters, the clock signal has the same phase before and after passing the clock channel if the tiny time delay induced by the inverters is not taken into consideration. However, because the power supply terminals of the output stage inverters $INV_2$ and $INV_4$ are coupled to receive the soft-start control signal $V_{ss}$, the level shifter 42 effectively outputs the amplitude modulating clock signals CLKS1 and CLKS2 whose amplitude changes along with the variation of the soft-start control signal $V_{ss}$, as shown in FIG. 3(b). In this case, the amplitude modulation period $T_{amp}$ is determined by the time constant $R_{eq} \cdot C_2$ of the soft-start control signal $V_{ss}$.

It should be noted that although in the embodiment described above the soft-start charge pump circuit 31 employs two clock signals, the present invention is not limited to this and may be applied to a case that the soft-start charge pump circuit 31 employs one clock signal or three and more, overlapping or non-overlapping, clock signals. As for the soft-start charge pump circuit 31 employing n clock signals where n is a positive integer, the level shifter 42 may be correspondingly provided with n clock channels for modulating the amplitude of the n clock signals, respectively. The n clock channels of the level shifter 42 may be constructed so differently with respect to each other as to provide the n clock signals with different modulations. Alternatively, the soft-start controller 41 may output a plurality of different soft-start control signals $V_{ss}$ to the level shifter 42, thereby providing the n clock signals with different modulations.

Figure 5A:
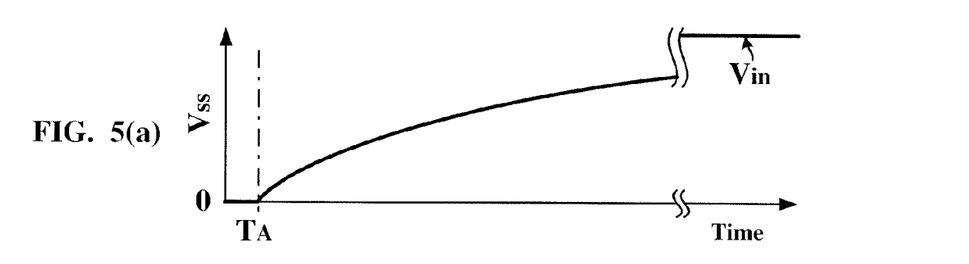
FIG. 5(a) is a timing chart showing a soft-start control signal output from a soft-start controller.
Figure 5B:
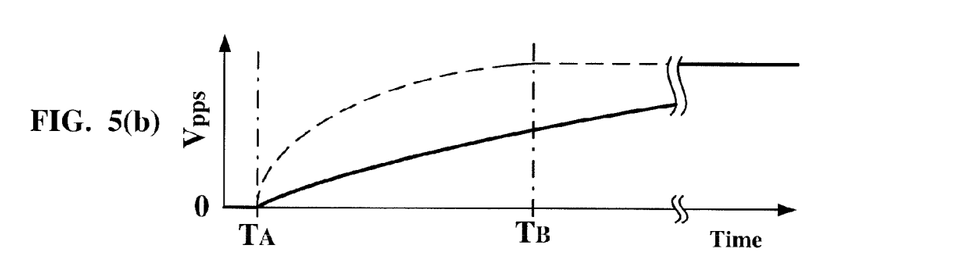
FIG. 5(b) is a timing chart showing a soft-start pumping voltage generated by the soft-start charge pump circuit.
Figure 5C:
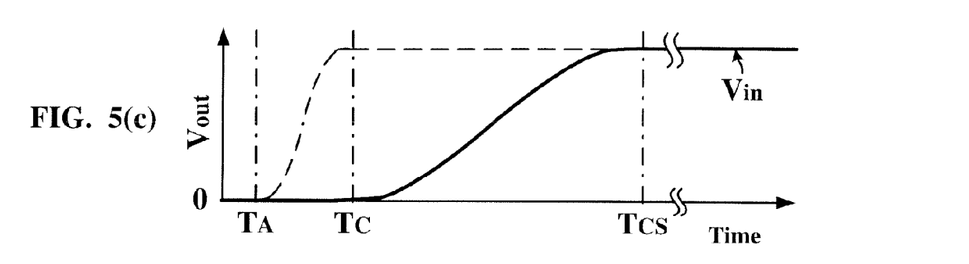
FIG. 5(c) is a timing chart showing an output voltage of the power switch.
Figure 5D:
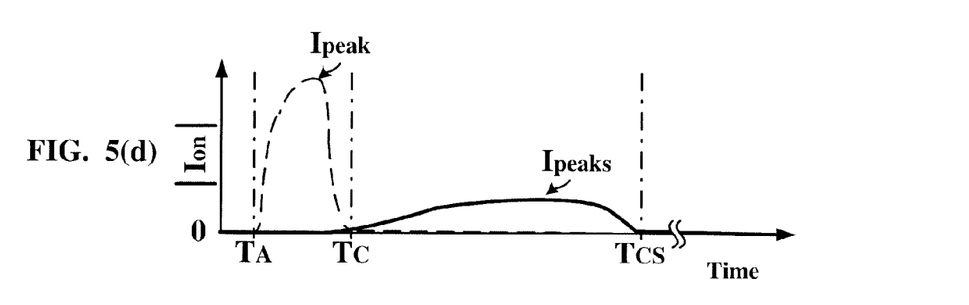
FIG. 5(d) is a timing chart showing an ON current flowing through the power switch.

FIGS. 5(a) to 5(d) are operational timing charts showing the soft-start charge pump circuit 31 according to the present invention applied to drive the power switch 30. FIG. 5(a) is a timing chart showing the soft-start control signal $V_{ss}$ output from a soft-start controller 41. FIG. 5(b) is a timing chart showing the soft-start pumping voltage $V_{pps}$ generated by the soft-start charge pump circuit 31. FIG. 5(c) is a timing chart showing the output voltage $V_{out}$ of the power switch 30. FIG. 5(d) is a timing chart showing the ON current $I_{on}$ flowing through the power switch 30. In FIGS. 5(b) to 5(d), solid lines are representative of operational characteristics achieved according to the present invention while dotted lines are representative of the conventional operational characteristics shown in FIGS. 2(a) to 2(c), for the sake of comparison and making apparent the utility and advantages achieved according to the present invention. It should be noted that only is shown in FIG. 5(a) a single solid line because the prior art fails to provide the soft-start control signal $V_{ss}$ according to the present invention.

Referring to FIG. 5(a), the soft-start control signal $V_{ss}$ gradually changes from the activation value at the time $T_A$ to the stable value, which is set to be equal to the supply voltage source $V_{in}$ in this embodiment, such that the amplitude of the amplitude modulating clock signals 313 gradually increases along with the soft-start control signal $V_{ss}$ to become stable at $V_{in}$, as described above.

Referring to FIG. 5(b), the soft-start pumping voltage $V_{pps}$ is zero before the time $T_A$ because the soft-start charge pump circuit 31 stays at a disable state. The soft-start charge pump circuit 31 is activated on the time $T_A$, starting the voltage boosting operation. Since the amplitude of the amplitude modulating clock signals 313 begins to gradually increase upon the activation time $T_A$, the soft-start pumping voltage $V_{pps}$ of the soft-start charge pump circuit 31 rises with a slower rate of increase than the pumping voltage $V_{pp}$ of the conventional charge pump 11 does. Compared with the conventional pumping voltage $V_{pp}$ which is stable by the time $T_B$, the soft-start pumping voltage $V_{pps}$ takes a significantly longer time to reach stable.

Referring to FIGS. 5(c) and 5(d), the power switch 30 is turned on later than the power switch 10 because the soft-start pumping voltage $V_{pps}$ rises with a slower rate, resulting in a later activation of the output voltage $V_{out}$ of the power switch 30. As described above, the soft-start pumping voltage $V_{pps}$ is applied to control the gate electrode of the power switch 30. Due to its proportional relationship to the gate voltage, the ON resistance of the power switch 30 decreases along with the increase of the soft-start pumping voltage $V_{pps}$. Because the soft-start pumping voltage $V_{pps}$ increases with the slower rate than the conventional pumping voltage $V_{pp}$ does, the ON resistance of the power switch 30 never falls suddenly to the minimum shortly after the activation. As a result, the power switch 30 utilizes the gradually reducing ON resistance to effectively suppress the ON current $I_{on}$ flowing through itself, especially to suppress the inrush current when the output capacitor $C_o$ has not yet been charged upon the activation.

In one embodiment of the present invention, assumed that the supply voltage source $V_{in}$ is about 5 volts, the conventional output voltage $V_{out}$ takes about 200 microseconds ($\mu s$) to reach 5 volts from the activation of the charge pump circuit 11 while the output voltage $V_{out}$ according to the present invention takes about 800 microseconds ($\mu s$) to reach 5 volts from the activation of the soft-start charge pump circuit 31. In this case, the conventional maximum inrush current $I_{peak}$ is about 5.4 amperes (A) while the maximum inrush current $I_{peaks}$ according to the present invention is about 1.1 amperes (A). Therefore, the soft-start charge pump circuit 31 effectively suppresses the inrush current and can be applied to appropriately drive the power switch 30.

Figure 6A:
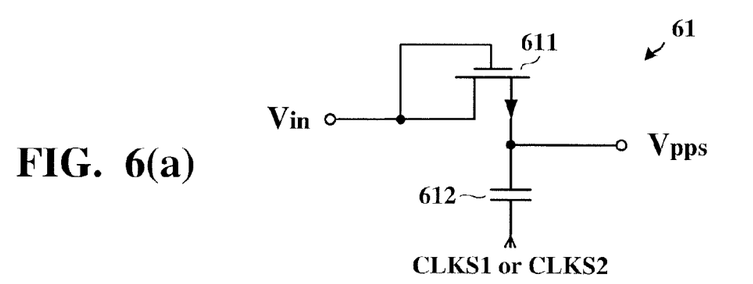
FIGS. 6(a) to 6(c) are detailed circuit diagrams showing three examples of a clock-amplitude-dependent charge pump according to the present invention.
Figure 6B:
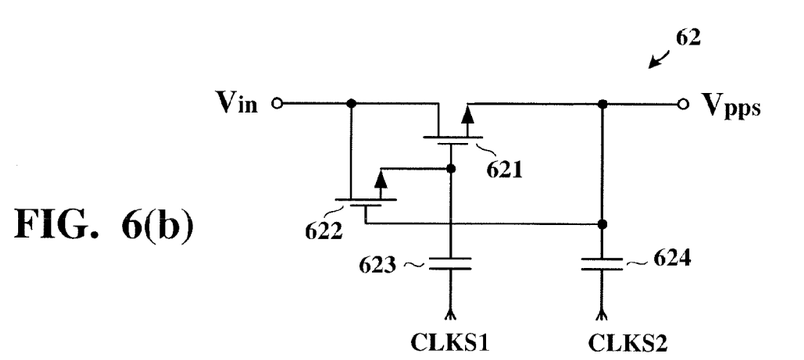
Figure 6C:
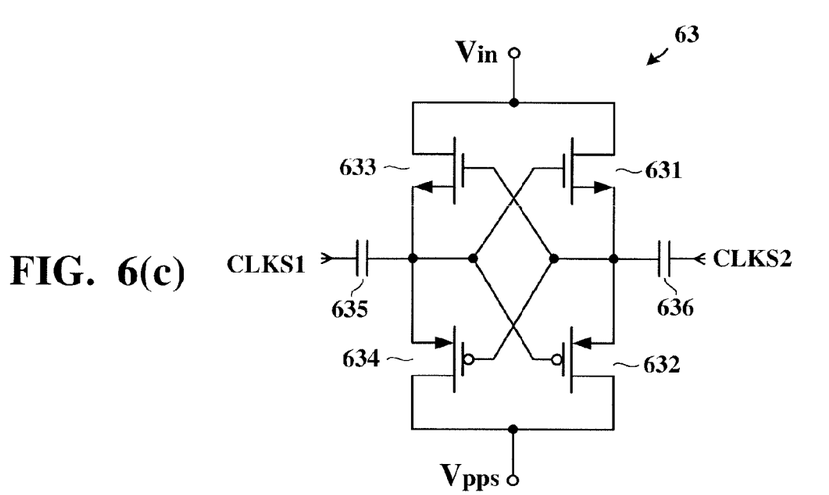

FIGS. 6(a) to 6(c) are detailed circuit diagrams showing three examples of a clock-amplitude-dependent charge pump 312 according to the present invention. Referring to FIG. 6(a), a charge pump stage 61 is identical in the circuit function to one stage 110 of the Dickson type charge pump shown in FIG. 1(b) except that a diode-connected NMOS transistor 611 is employed to implement the diode 111 shown in FIG. 1(b). A pump capacitor 612 may be driven by the amplitude modulating clock signals CLKS1 and CLKS2, depending on whether the pump capacitor 612 belongs to the odd-numbered pump stages or the even-numbered pump stages.

Referring to FIG. 6(b), a charge pump stage 62 includes two NMOS transistors 621 and 622 and two pump capacitors 623 and 624. When the clock signal CLKS1 is low and the clock signal CLKS2 is high, the NMOS transistor 622 is turned on and the pump capacitor 623 is charged to the supply voltage source $V_{in}$. At this moment, the NMOS transistor 621 is turned off. When the clock signal CLKS1 becomes high and the clock signal CLKS2 becomes low, the pump capacitor 624 pulls downward the gate voltage of the NMOS transistor 622 and then turns off the NMOS transistor 622 while the pump capacitor 623 pushes upward the gate voltage of the NMOS transistor 621 over the supply voltage source $V_{in}$ and then turns on the NMOS transistor 621. As a result, the pump capacitor 624 is charged to the complete supply voltage source $V_{in}$ without any loss of voltage due to the forward diode drop. When the clock signal CLKS1 becomes low again and the clock signal CLKS2 becomes high again, the NMOS transistor 621 is turned off due to the fall of the gate voltage, and the soft-start pumping voltage $V_{pps}$ is boosted to the supply voltage source $V_{in}$ plus the modulating clock amplitude $V_{clk}$.

Referring to FIG. 6(c), a charge pump stage 63 includes two NMOS transistors 631 and 633 and two PMOS transistors 632 and 634, constructed as a cross-coupled latch circuit. The charge pump stage 63 further includes two pump capacitors 635 and 636 driven by the clock signals CLKS1 and CLKS2, respectively. When the clock signal CLKS1 is high and the clock signal CLKS2 is low, the NMOS transistor 631 is turned on and the pump capacitor 636 is charged to the supply voltage source $V_{in}$. When the clock signal CLKS1 becomes low and the clock signal CLKS2 becomes high, the PMOS transistor 632 is turned on for boosting the soft-start pumping voltage $V_{pps}$ to the supply voltage source $V_{in}$ plus the modulating clock amplitude $V_{clk}$. At this moment, the NMOS transistor 633 is also turned on for charging the pump capacitor 635 to the supply voltage source $V_{in}$. When the clock signal CLKS1 becomes high again and the clock signal CLKS2 becomes low again, the PMOS transistor 634 is turned on for boosting the soft-start pumping voltage $V_{pps}$ to the supply voltage source $V_{in}$ plus the modulating clock amplitude $V_{clk}$.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A soft-start charge pump circuit, comprising:
   a clock amplitude modulator for generating at least one amplitude modulating clock signal whose amplitude gradually changes from an activation value during an amplitude modulation period, the amplitude modulation period lasting longer than a period of the at least one amplitude modulating clock signal by one or more metric orders; and
   a charge pump, driven by the at least one amplitude modulating clock signal, for converting a supply voltage source to a pumping voltage, wherein:
   the charge pump is activated by the at least one amplitude modulating clock signal with the amplitude of the activation value such that an absolute value of the pumping voltage thus generated is relatively small, the charge pump after the activation being controlled in such a way that the absolute value of the pumping voltage gradually changes along with the modulation of the amplitude of the at least one amplitude modulating clock signal,
   wherein the clock amplitude modulator includes:
   a soft-start controller for generating a soft-start control signal, and
   a level shifter for modulating the amplitude of the at least one amplitude modulating clock signal in response to the soft-start control signal,
   wherein the soft-start controller includes:
   a switch capacitor equivalent resistor having a first terminal and a second terminal, the first terminal being connected to the supply voltage source, and
   a charging capacitor connected between the second terminal and a ground potential such that the soft-start control signal is asserted at the second terminal.

2. The soft-start charge pump circuit according to claim 1, wherein:
   the level shifter includes:
   at least one clock channel for respectively generating the at least one amplitude modulating clock signal, each of the at least one clock channel having an output stage inverter whose power supply terminal is coupled to receive the soft-start control signal, thereby respectively controlling the amplitude of the at least one amplitude modulating clock signal.

3. The soft-start charge pump circuit according to claim 2, wherein:
   each of the at least one clock channel further includes:
   an input stage inverter having a power supply terminal coupled to receive the supply voltage source for providing a constant amplitude clock signal to the output stage inverter.

* * * * *